United States Patent
Stadelmeier et al.

(10) Patent No.: US 8,442,127 B2
(45) Date of Patent: *May 14, 2013

(54) METHOD FOR TRANSMITTING A SIGNAL VIA A POWER LINE NETWORK, TRANSMITTER, RECEIVER, POWER LINE COMMUNICATION MODEM AND POWER LINE COMMUNICATION SYSTEM

(75) Inventors: Lothar Stadelmeier, Stuttgart (DE); Andreas Schwager, Waiblingen (DE); Daniel Schneider, Stuttgart (DE)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/412,279

(22) Filed: Mar. 5, 2012

(65) Prior Publication Data

US 2012/0163436 A1   Jun. 28, 2012

Related U.S. Application Data

(63) Continuation of application No. 12/595,265, filed as application No. PCT/EP2008/006212 on Jul. 28, 2008, now Pat. No. 8,160,162.

(30) Foreign Application Priority Data

Aug. 22, 2007   (EP) ..................... 07016489

(51) Int. Cl.
 *H04B 3/00* (2006.01)
 *H04L 25/00* (2006.01)
(52) U.S. Cl.
 USPC ........... 375/257; 375/222; 375/220; 375/224; 375/227; 375/218; 340/538.15; 340/538.16; 370/248; 370/249

(58) Field of Classification Search ............ 375/257, 375/222, 220, 224, 227, 218, 258, 346; 340/538.15, 340/538.16; 370/248, 249
See application file for complete search history.

(56) References Cited

U.S. PATENT DOCUMENTS

| 4,060,735 A | 11/1977 | Pascucci et al. |
| 5,712,614 A | 1/1998 | Patel et al. |

(Continued)

FOREIGN PATENT DOCUMENTS

| EP | 1 643 658 | 4/2006 |
| GB | 2 383 724 | 7/2003 |
| WO | WO 2005/062915 A2 | 7/2005 |

OTHER PUBLICATIONS

The Extended European Search Report issued Oct. 25, 2011, in Application No. / Patent No. 11007114.9-2411.

(Continued)

*Primary Examiner* — Phuong Phu
(74) *Attorney, Agent, or Firm* — Oblon, Spivak, McClelland, Maier & Neustadt, L.L.P.

(57) ABSTRACT

A method for receiving signals over a power line network, within the power line network at least one transmitter and at least one receiver communicate via at least two channels, each of the channels having a respective feeding port of the at least one transmitter and a respective receiving port of the at least one receiver, and the receiver having at least two receiving ports. The method determines a channel characteristic of each of the channels, applies a receiving port selection criterion based on the channel characteristic, and selects an excluded receiving port among the at least two receiving ports based on the receiving port selection criterion, the excluded receiving port is not used during further communication.

15 Claims, 9 Drawing Sheets

FP1: P-N
FP2: P-PE
FP3: N-PE

RP1: P-N
RP2: P-PE
RP3: N-PE
RP4: CM

U.S. PATENT DOCUMENTS

| | | | |
|---|---|---|---|
| 6,249,213 B1 | 6/2001 | Horne | |
| 7,852,207 B2 | 12/2010 | Berkman et al. | |
| 8,160,162 B2 * | 4/2012 | Stadelmeier et al. | 375/257 |
| 2003/0045970 A1 | 3/2003 | Maryanka | |
| 2006/0073805 A1 | 4/2006 | Zumkeller et al. | |
| 2006/0093058 A1 | 5/2006 | Skraparlis | |
| 2006/0226958 A1 | 10/2006 | Baril et al. | |
| 2007/0274199 A1 | 11/2007 | Logvinov et al. | |
| 2007/0279196 A1 | 12/2007 | Macaluso et al. | |
| 2008/0260010 A1 | 10/2008 | Schwager et al. | |
| 2008/0310457 A1 | 12/2008 | Yamashita et al. | |
| 2011/0051786 A1 | 3/2011 | Schwager et al. | |
| 2011/0110408 A1 | 5/2011 | Schwager et al. | |
| 2011/0116555 A1 | 5/2011 | Schwager et al. | |
| 2011/0129007 A1 | 6/2011 | Schwager et al. | |

OTHER PUBLICATIONS

Office Action (with translation) dated Dec. 14, 2011, issued in counterpart Russian Application No. 2010105044 (9 pages).

U.S. Appl. No. 13/502,774, filed Jun. 11, 2012, Schwager, et al.

Chinese Office Action issued Apr. 25, 2012 in Patent Application No. 200880104783.0 with English Translation.

* cited by examiner

▨ Channel condition 1, use of 1st set of en-/decoding matrices
▧ Channel condition 2, use of 2nd set of en-/decoding matrices

METHOD FOR TRANSMITTING A SIGNAL VIA A POWER LINE NETWORK, TRANSMITTER, RECEIVER, POWER LINE COMMUNICATION MODEM AND POWER LINE COMMUNICATION SYSTEM

CROSS-REFERENCE TO RELATED APPLICATIONS

This application is a continuation of U.S. application Ser. No. 12/595,265, filed Oct. 9, 2009, the entire content of which is incorporated herein by reference. U.S. application Ser. No. 12/595,265 is the National Stage of PCT/EP08/06212 and claims priority under 35 U.S.C. 119 to European Patent Application No. 07016489.2, filed Aug. 22, 2007.

DESCRIPTION

The invention relates to a method for transmitting signals via a power line network. a transmitter and a receiver. The invention relates as well to a power line communication modem and a power line communication system.

BACKGROUND

Power line communication (PLC). also called mains communication, power line transmission (PLT), broadband power line (BPL), power band or power line networking (PLN), is a term describing several different systems for using power distribution wires for simultaneous distribution of data. A carrier can communicate voice and data by superimposing an analogue signal over the standard 50 Hz or 60 Hz alternating current (AC). For indoor applications PLC equipment can use household electrical power wiring as a transmission medium.

In order to increase the bandwidth of PLC systems it has been proposed to use multiple-input-multiple-output schemes (MIMO) which are known from wireless communication systems.

It is an object of the invention to further increase the bandwidth of PLC systems.

The object is solved by a method for transmitting a signal. a transmitter. a receiver. a power line communication modem and a power line communication.

Further embodiments are defined in the dependent claims.

Further details of the invention will become apparent from a consideration of the drawings and ensuing description.

DETAILED DESCRIPTION

In the following, embodiments of the invention are described. It is important to note that all described embodiments in the following and their properties and technical features may be combined in any way, i.e. there is no limitation that certain described embodiments, properties and technical features may not be combined with others.

Figure 1:
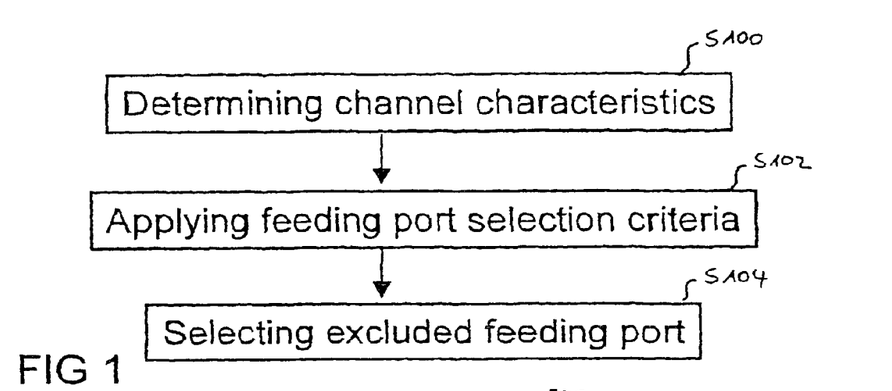
FIG. 1 shows steps of one embodiment of the invention.

In FIG. 1 in a step S100 a channel characteristic is determined and in a power line network a transmitter and at least one receiver communicate via at least two channels, each of said channels having a respective feeding port of said at least one transmitter and a respective port of said at least one transmitter and said transmitter having at least two feeding ports. A corresponding power line network is depicted schematically in FIG. 3 that will be explained below.

The channel characteristics may be derived from a channel estimation and describe the channel by, for instance, bit-error-rate (BER) or signal-to-noise-ratio (SNR). Other channel characteristics may be the power or the energy of the received signal on said channel.

In a step S102 a feeding port selection criterion is applied based on the channel characteristic determined in step S100. While applying the feeding port selection criteria the channel characteristics of different channels are compared in order to decide, which feeding port or feeding ports would be used, since the best reception is ensured while using these feeding ports.

In a step S104 an excluded feeding port is selected among the at least two feeding ports based on the feeding port selection criteria, wherein the excluded feeding port is not used during further communication.

According to Kirchhoff's Rule in PLC systems in presence of three wires or conductors there are only two independent feeding possibilities.

In step S104 the feeding port is selected based on the feeding port selection criterion, thereby identifying the worst channel characteristics. Since the channel is quasi-static for PLC systems, the selection of the feeding port remains stable until there is a dedicated change in the PLC network topology (for instance a light has been switched on or a device has been plugged or unplugged).

A channel capacity C of a channel might be calculated as $$C = B \cdot \frac{1}{N} \sum_{i=1}^{N} \log_2\left(det\left(I_{N_R} + \frac{1}{n_T} \cdot SNR \cdot H_i \cdot H_i^H\right)\right)$$

with: B being the bandwidth of the channel, N being the number of OFDM sub-carriers, $n_R$ being the number of receive ports, $I_{NR}$ being the $n_R \times n_R$ identity matrix, $n_T$ being the number of transmit ports, SNR being the signal-to-noise ratio, H being the $n_R \times n_T$ channel matrix.

Alternatively, in an adaptive OFDM-(orthogonal frequency division multiplexing)-system, a channel equalizer within the receiver provides information about the signal-to-noise-ratio (SNR) for each sub-carrier of the OFDM system. Depending on the SNR condition on each sub-carrier, a suited constellation size is selected. The less SNR is available, the more robust the constellation has to be. As an example, for quadrature amplitude modulation (QAM), different constellations with a different SNR requirement exist.

$$\text{constellation} \in \begin{cases} BPSK & 1\text{bit/symbol} \\ QPSK & 2\text{bits/symbol} \\ 16-QAM & 4\text{bits/symbol} \\ 64-QAM & 6\text{bits/symbol} \\ 256-QAM & 8\text{bits/symbol} \\ 1024-QAM & 10\text{bits/symbol} \\ \ldots & \ldots \end{cases}$$

Finally, the overall bit loading of one OFDM symbol can be taken as qualitative capacity criteria. The higher the total number of bits for one OFDM symbol (as a sum over all N sub-carriers), the higher the capacity C:

$$C \propto \sum_{i=1}^{N} \text{constellation}_i$$

In case of MIMO, there are equalizers for all different receiving ports M. In this case, the overall sum of all channel equalizers can be taken as feeding port selection criterion:

$$C \propto \sum_{m=1}^{M} \sum_{i=1}^{N} \text{constellation}_{m,i}$$

In a further embodiment a period of an alternating current on said power line network is divided at least into a first and a second part. A first channel characteristic is determined for the first part and a second channel characteristic is determined for the second part. Then a first excluded feeding port is selected for said first part based on said feeding port selection criteria and a second excluded feed is selected for said second part based on said feeding port selection criteria. If impedance-modulating devices are present in the power line network the main impedance changes depending on the line cycle duration and depending on the number of impedance modulating devices. When the number of impedance modulating devices is not changing, the impedance changes are periodic with the line cycle duration, e.g. 20 ms for a 50 Hz alternating current. The impedance changes have dramatic influence to data transmission over power line. An impedance change during a data burst results in wrong channel equalization values after the impedance change and causes non-correctable transmission errors. Therefore it is proposed to place the burst in time intervals where the impedance keeps stable. In presence of impedance-modulating devices the feeding selection is performed separately for each impedance condition so that the excluded feeding port change with different impedance settings. The feeding port selection can include an additional port selection criterion. Feeding ports, which are at least faced to impedance modulating behavior, may be determined, since not every feeding point combination is faced to the same level of impedance modulation.

According to a further embodiment a respective channel capacity based on the channel characteristics for said channel is determined and an excluded channel with the channel capacity below a predetermined threshold is determined which is not used during further communication afterwards.

Within this embodiment not only the feeding ports are determined but also singular channels may be excluded from further communication. This might be useful in case of impedance modulating devices or in case of impulsive noise on the power line network.

In a further embodiment the channel characteristics of the channel is determined by transmitting an OFDM test signal via a plurality of channels simultaneously and determining a respective plurality of channel capacities for said plurality of channels based on the received version of said OFDM test signal.

According to a further embodiment a multiple-input-multiple-output coding scheme (MIMO-scheme) is set based on the respective channel capacities. By setting an appropriate MIMO in data throughput and reliability of the PLC system is further optimized. Depending on the channel characteristics and/or the bandwidth demand of the application, an appropriate MIMO coding scheme is selected. Available MIMO modes are tested sequentially and the best MIMO mode regarding throughput and/or bit error rate is chosen. In further embodiments the data transmission is optimized regarding maximum throughput and/or transmission reliability. For instance, Alamouti MIMO is designed in a way to achieve better bit error rates (BER) performance without increasing the throughput rate (special code rate is one). On the other hand, multiplex MIMO systems like HBLAST (Horizontal Bell Laboratories Layered Space-Time), VBLAST (Vertical Bell Laboratories Layered Space-Time) or Eigenbeamforming-MIMO are designed to maximize the data throughput while BER performance optimization on the physical layer is not the primary focus (special code rate is two).

Figure 2A:
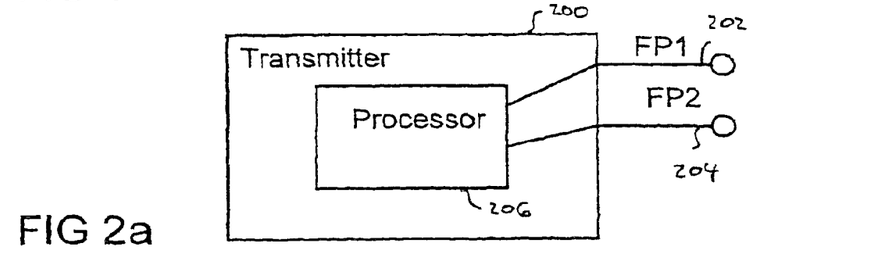
FIG. 2a shows a block diagram of a transmitter according to a further embodiment of the invention.

In FIG. 2a a block diagram of a transmitter 200 is depicted. The transmitter 200 comprises two feeding ports 202, 204 each of which is configured to feed signals into at least two channels and a processor 206 configured to select an excluded feeding port of said at least two feeding ports 202, 204 based on a determination of channel characteristics of said at least two channels, said processor 206 being further configured to not use channels of said at least two channels during communication which are fed by said excluded feeding port (202 or 204).

With respect to the wording "transmitter" and "receiver" it should be emphasized that within this description "transmitter" and "transmitting modem" as well as "receiver" and "receiving modem" are used interchangeably, since a power line communication modem for bidirectional communication comprises a transmitter as well as a receiver. Thus, in a power line system the communication of payload data between power line communication modems is performed between a transmitting modem (i.e. the transmitter) and a receiving modem (i.e. the receiver).

In a further embodiment the processor 206 might be further configured to exclude channels with the channel capacity below the predetermined threshold from further communication and the processor 206 might be configured to set a multiple-input multiple-output coding scheme based on the respective channel capacities.

Figure 2B:
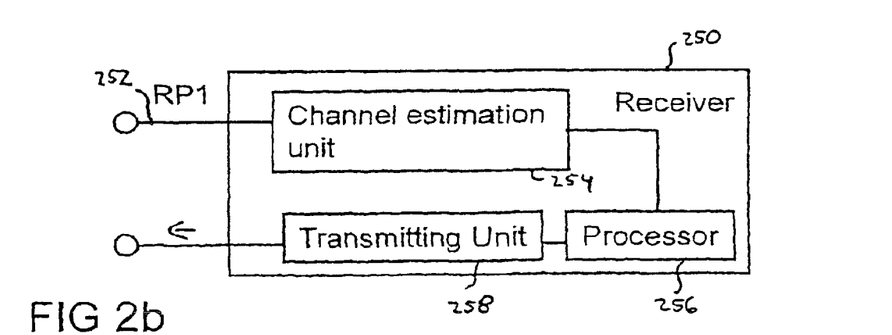
FIG. 2b shows a block diagram of a receiver according to a further embodiment of the invention.

In FIG. 2b a block diagram of a receiver 250 is depicted. The receiver 250 comprises at least one receiving port 252, which is the receiving end of at least two channels from the power line communication network, the channels being fed by at least two different feeding ports (not depicted). The receiving port 252 is connected to a channel estimation unit 254, which is configured to determine channel characteristics of said at least two channels. A processor 256 is connected to said channel estimation unit 254 and is configured to select the feeding port, which should be excluded from further communication based on the determination of the channel characteristics from the channel estimation unit 254. A transmitting unit 258 is connected to the processor 256 for transmitting an information about the excluded feeding port to a transmitter, which afterwards only uses non-excluded feeding ports for the communication with the receiver 250.

Thus, the identification of the excluded feeding port might be performed in the receiver 250 or in the transmitter 200 depending on the information which is fed back to the transmitter. If the channel characteristics are fed back from the receiver 250 to the transmitter 200, then within the transmitter the excluded feeding port is selected. If the receiver 250 already selects the excluded feeding port, then only an information about the excluded feeding port has to be fed back to the transmitter 200.

Figure 3:
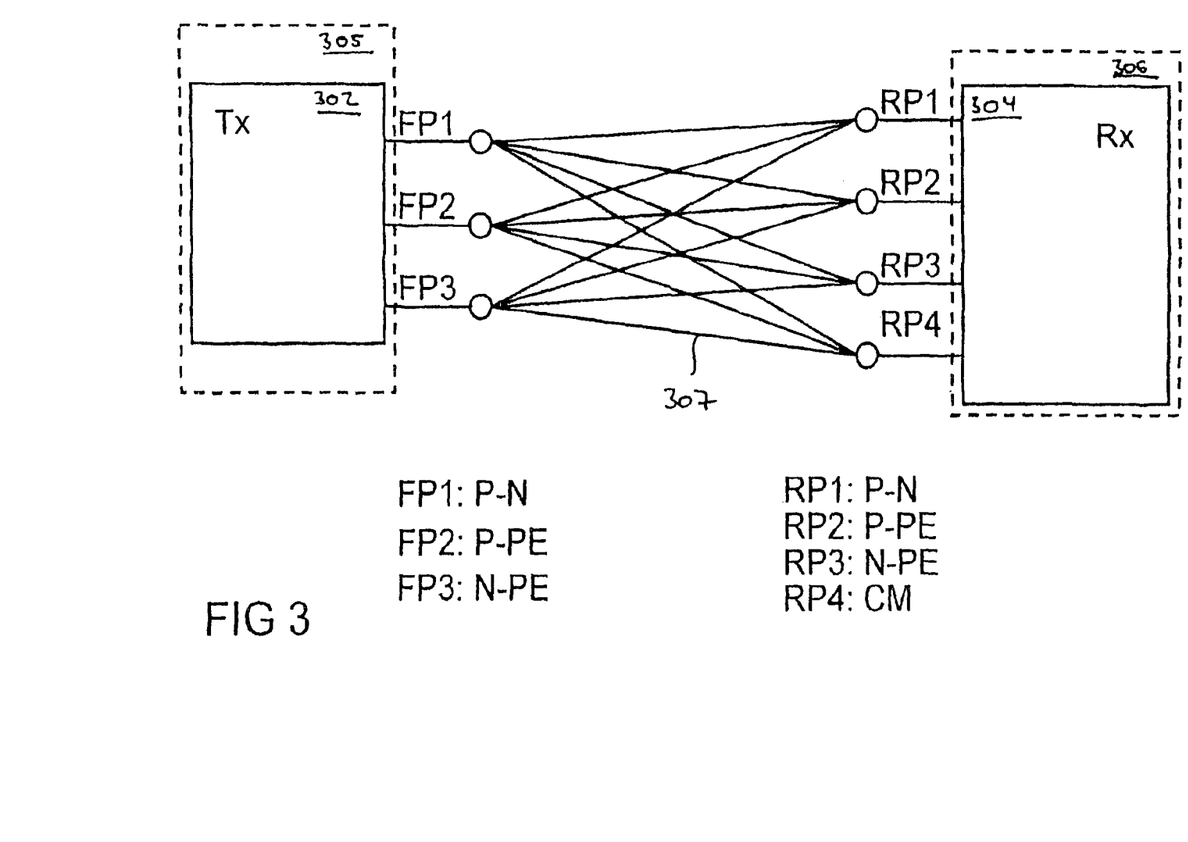
FIG. 3 shows a block diagram of a power line communication system according to a further embodiment of the invention.

In FIG. 3 a schematic block diagram of a power line communication system 300 is depicted, which comprises a transmitter 302 and a receiver 304. The transceiver 302 might be part of a power line communication modem 305 and the receiver 304 might be part of a further power line communication modem 306. The transceiver transmits signals to the receiver 304 among a plurality of channels 307 wherein each of the plurality of channels 307 has a feeding port FP1, FP2, or FP3 and a receiving port RP1, RP2, RP3, or a RP4. In the depicted example with three feeding ports FP1, FP2, FP3 and four receiving ports RP1, RP2, RP3, RP4 both possible channels 306 might be used for transmitting a signal from the transmitter 302 to the receiver 304.

Figure 4:
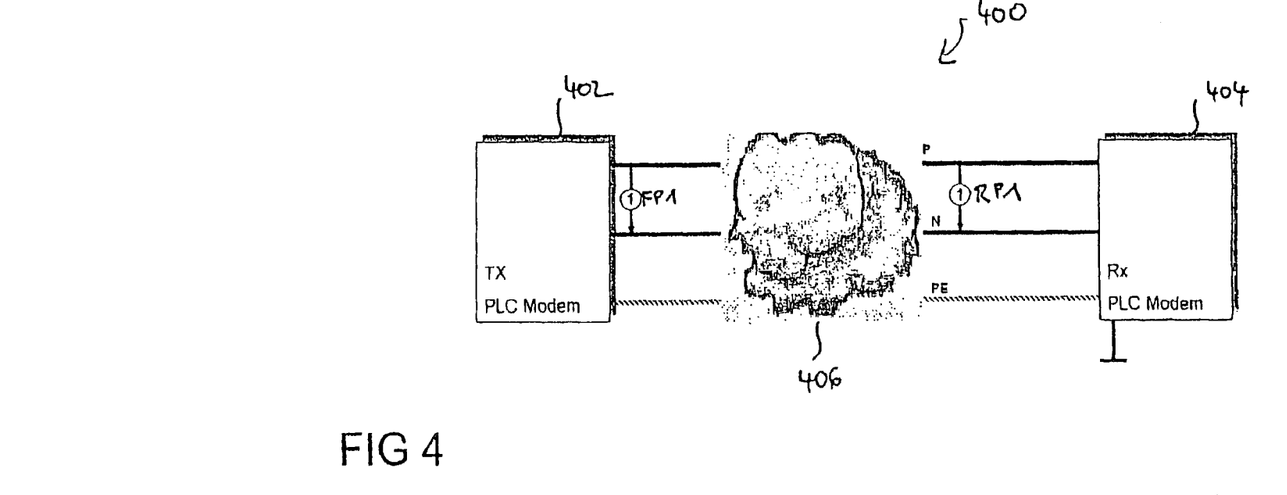
FIG. 4 shows a block diagram of a conventional power line communication system.

In FIG. 4 the conventional power line communication system 400 is depicted with a transmitting PLC modem 402 and a receiving PLC modem 404. The transmitting PLC modem 402 and the receiving PLC modem 404 are connected via power lines P, N, PE and a corresponding power line network 406. The wires which represent the power line network are a phase line P, a neutral line N and a protective earth line PE. In conventional power line communication schemes only one feeding port is used, i.e. the feeding of signals between the phase P and the neutral line N and also only one receiving port RP1 is used while receiving the signal between the phase line P and the neutral line N at the receiver 404.

Figure 5:
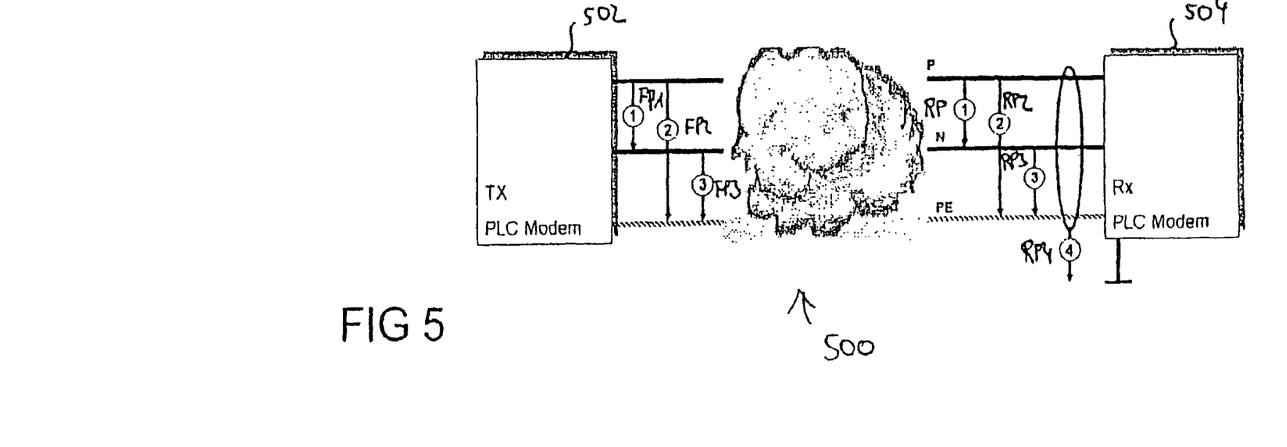
FIG. 5 shows a power line communication system according to a further embodiment of the invention.

When using also the protective earth line PE—as it is depicted in FIG. 4 for a further embodiment of the power line communication system 500—it is possible for a transmitting PLC modem 502 to transmit a signal to a receiving PLC modem 504 via any combination of the phase line P, the neutral line N and the protective earth line PE. Thus, in total three feeding port possibilities FP1. FP2, FP3 are present, namely a first feeding port FP1 where the trans-witted signal is sent via the phase line P and the neutral line N, a second feeding port FP2 where the signal is sent between the phase line P and the protective earth line PE and a third feeding port FP3 where the signal is sent between the neutral line N and the protective earth line PE. On the receiver side there are a first receiving port RP1 evaluating a received signal between the phase line P and the neutral line N, a second receiving port RP2 evaluating a signal received between the phase line P and the protective earth line PE and a third receiving port RP3 evaluating a signal received between the neutral line N and the protective earth line PE. A fourth receiving port RP4 is also available, which describes the reception via a so-called common mode (CM). CM signals are created unintentionally at unbalanced networks. Unbalanced parasitic capacities from installations or devices to ground cause a CM current returning to the source. Due to electro-magnetic coupling between neighbored wires, cross talk arises, i.e. the transmit signal from any feeding port is visible on all four reception ports RP1, RP2, RP3, RP4.

Figure 6:
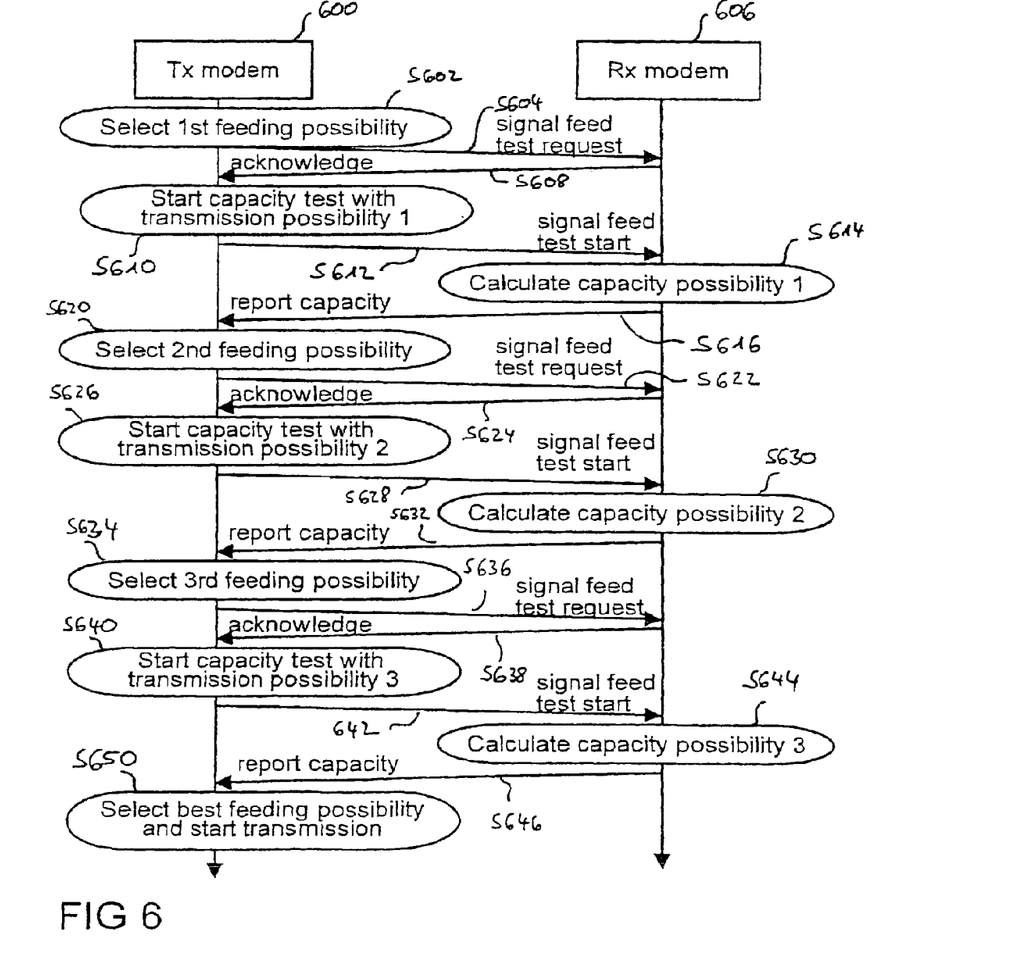
FIG. 6 shows steps of a further embodiment of the invention.

FIG. 6 shows a message sequence chart for the feeding port selection process. At the beginning the transmitting modem 600 selects in a step S602 the first (out of three) feeding possibilities and indicates this by a control message in a step S604 to the receiving modem 606. Such control messages might be handled in upper layers of any OSI layer system (e.g. a medium access layer (MAC) or even a data link control layer (DLC)). The receiving modem 606 acknowledges this request in a step S608 and waits for the start of the test transmission. The transmitting modem 600 starts the capacity test of the transmission possibility of the first feeding port 1 in a step S610 and sends a corresponding test signal in a step S612. In case the receiving modern 606 knows the length of a test transmission (e.g. a certain number of data bursts) it starts automatically to calculate the channel capacity as channel characteristic after the test sequence is received in a step S614. The result of the capacity calculation is sent back to the transmitter 600 in a step S616.

The steps are repeated for the other two remaining feeding possibilities. In a step S620 the transmitting modem 600 selects the second feeding possibility and indicates this by a control message in a step S622 to the receiving modem 606. The receiving modem 606 acknowledges this request in a step S624 and waits for the start of the next test transmission. The transmitting modem 600 starts the capacity test of the second feeding port FP2 in a step S626 and sends a corresponding test signal in a step S628. The receiving modem 606 calculates the channel capacity for this second feeding possibility in a step S630 and reports the capacity back to the transmitting modem 600 in a step S632.

In a step S634 the transmitting modem 600 selects the third feeding possibility and indicates this by a control message in a step S636 to the receiving modem 606. The receiving modem 606 acknowledges this request in a step S638 and waits for the start of the next test transmission. The transmitting modem 600 starts the capacity test of the third feeding port FP3 in a step S640 and sends a corresponding test signal in a step S642. The receiving modem 606 calculates the channel capacity for this second feeding possibility in a step S644 and reports the capacity back to the transmitting modem 600 in a step S646.

After all three test transmissions are finished; the transmitting modem 606 starts to send regular data bursts in a step S650.

Figure 7:
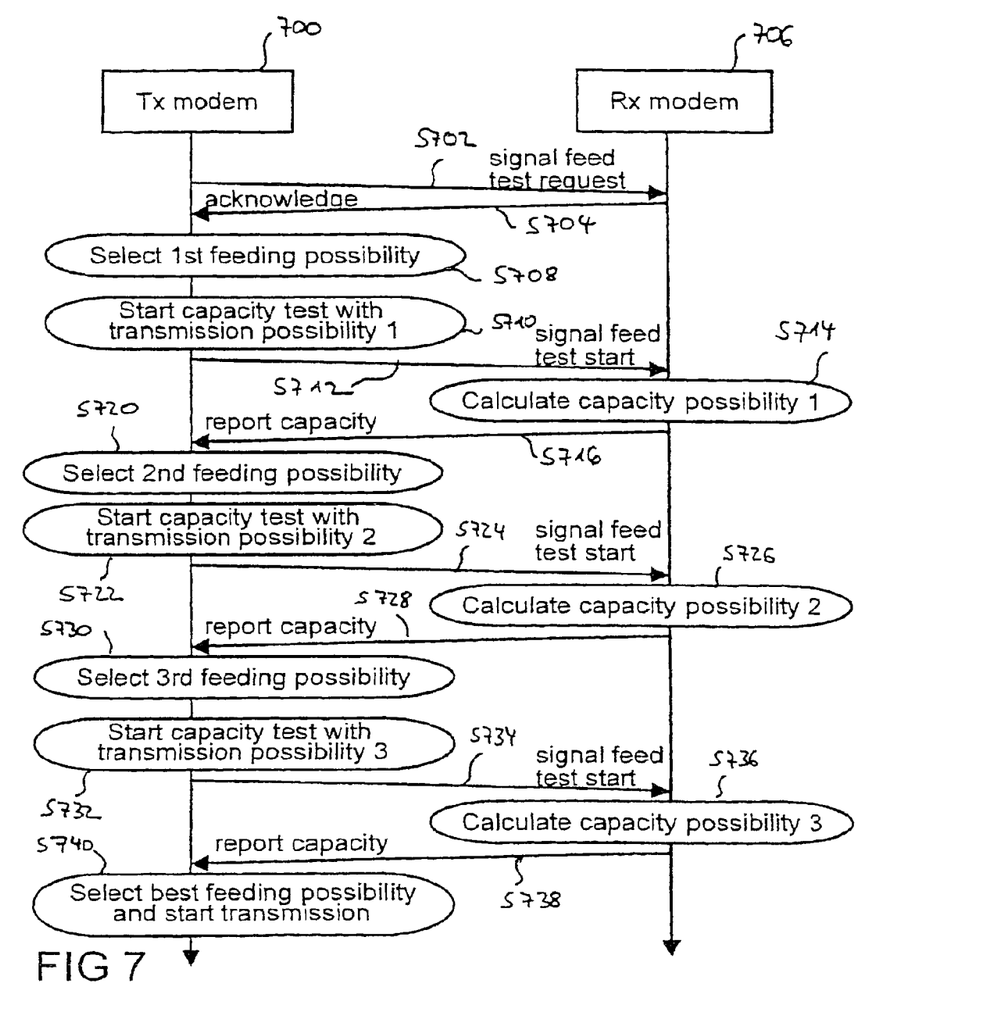
FIG. 7 shows steps of a further embodiment of the invention.

In FIG. 7 an alternative scheme for testing the channels is depicted. In case a fixed length of the test sequences is used, i.e. a receiving modem 706 knows the length of the test transmission from the transmitting modem 700, the handshaking to signal the start of the test sequence can be omitted. Thus, in a step S702 the transmitting modem 700 signals to the receiving modem 706 that a signal feed test is requested. In a step S704 the receiver 706 acknowledge the feed test request to the transmitter 700. In a step S708 the transmitter 700 selects the first feeding possibility and starts the capacity test directly for the first feeding port FP1 in a step S710. The test signal is transmitted in a step 712 and the receiving modem 706 calculates the capacity in a step S714. The channel capacity is reported back to the transmitter 700 in a step S716.

These steps are repeated for all feeding possibilities. In a step S720 the transmitting modem 700 selects the second feeding possibility and starts the capacity test directly for the second feeding port FP2 in a step S722. The test signal is transmitted in a step 724 and the receiving modem 706 calculates the capacity in a step S726. The channel capacity is reported back to the transmitting modem 700 in a step S728.

In a step S730 the transmitting modem 700 selects the first feeding possibility and starts the capacity test directly for the third feeding port FP3 in a step S732. The test signal is transmitted in a step S734 and the receiving modem 706 calculates the capacity in a step S736. The channel capacity is reported back to the trans-mating modem 700 in a step S738.

Afterwards the transmitting modem 700 selects the best feeding possibilities and starts the transmission in a step S740.

Figure 8:
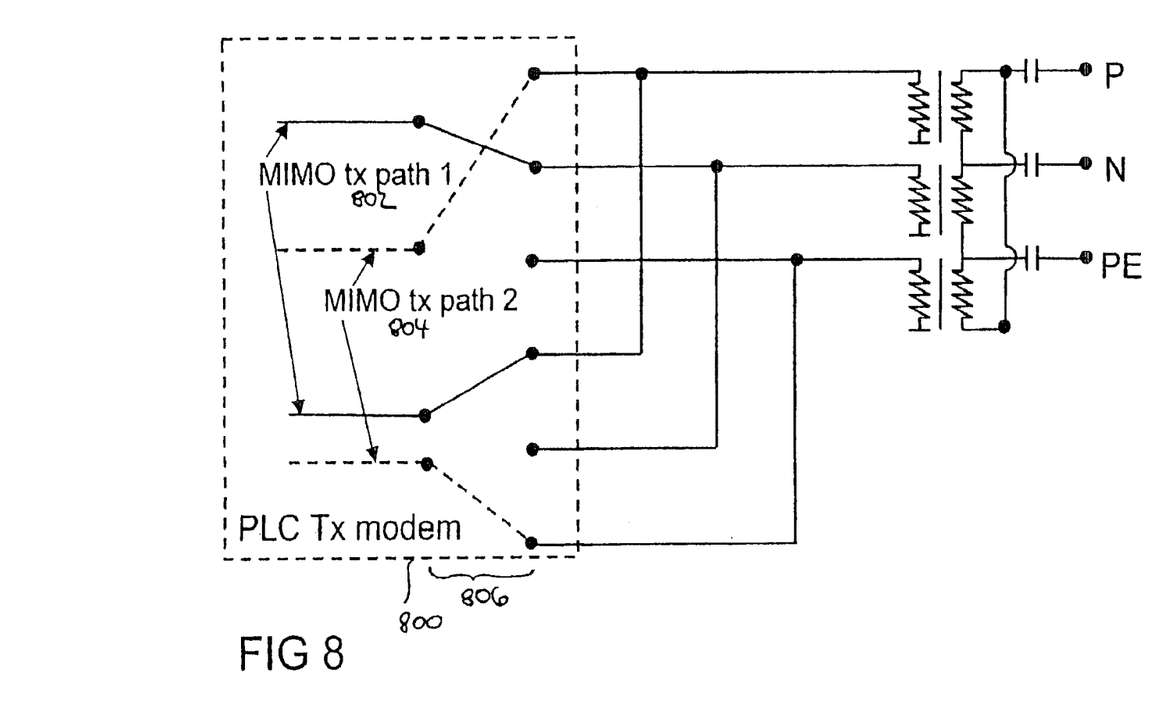
FIG. 8 shows a schematic block diagram to explain the function of a transmitter according to a further embodiment of the invention.

In FIG. 8 the block diagram of the transmitting PLC modem 800 is depicted in order to explain how to switch between the different feeding ports in the transmitter 800. Depending on the results of the feeding port selection mechanism, two of the available three ports are selected from the two MIMO transmitting paths 802, 804 with the help of a switching mechanism 806. MIMO transmitting path 802 and MIMO transmitting path 2 804 are never set to the same position within the switching mechanism 806. Within this embodiment the first transmitting path 802 is using P-N as feeding port and the second transmitting path is using P-PE as feeding port.

Figure 9A:
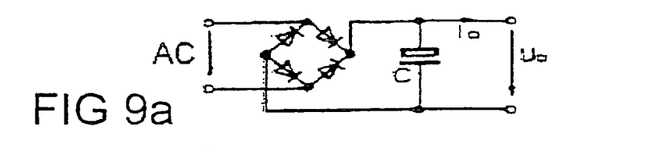
FIG. 9A shows a circuit diagram for impedance modulating devices.
Figure 9B:
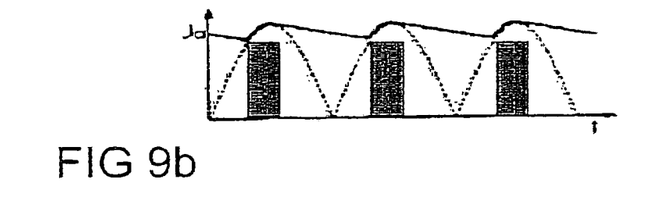
FIG. 9B shows a schematic diagram of the time-dependence of the voltage, when impedance modulating devices are present.

FIG. 9A shows a circuit diagram and FIG. 9B shows a corresponding time dependence of the voltage UA on a power line, if impedance modulating devices are present. Mobile phone chargers and other charging devices convey in the circuitry that has the following properties:

If the capacity C charges, HF-signals from mains are short-cut.
If the diode is blocking, the rectifier has high input impedance.
So the mains impedance changes at least twice within a line cycle duration.

The periodic impedance changes have dramatic influence to data transmission over power line. An impedance change during a data burst results in wrong channel equalization values after the impedance change and causes non-correctable transmission errors. Therefore it is important to place the burst in time intervals where the impedance keeps stable, which is a task for a medium access control (MAC) layer of a power line communication system.

Figure 9C:
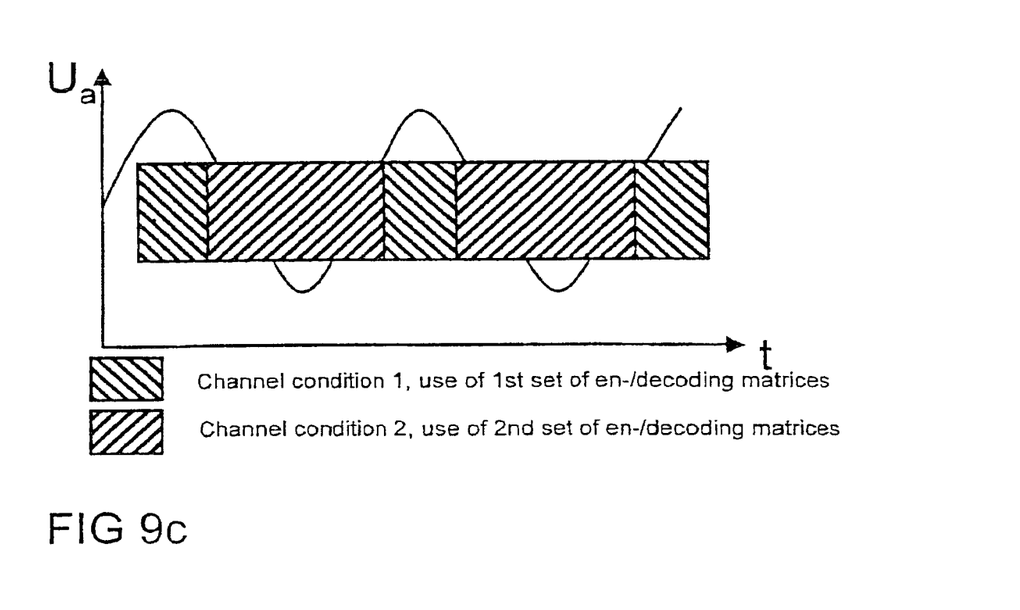
FIG. 9C shows a schematic diagram of a voltage-time relation with parts of similar channel capacities to explain a further embodiment of the invention.

In FIG. 9C it is depicted that depending on the line cycle frequency, different channel conditions result in different feeding port selections and/or different MIMO schemes (in this example: two different channel conditions, but all different channel conditions might be possible as well). The Y-axis represents the voltage UA of an AC line cycle.

Figure 10:
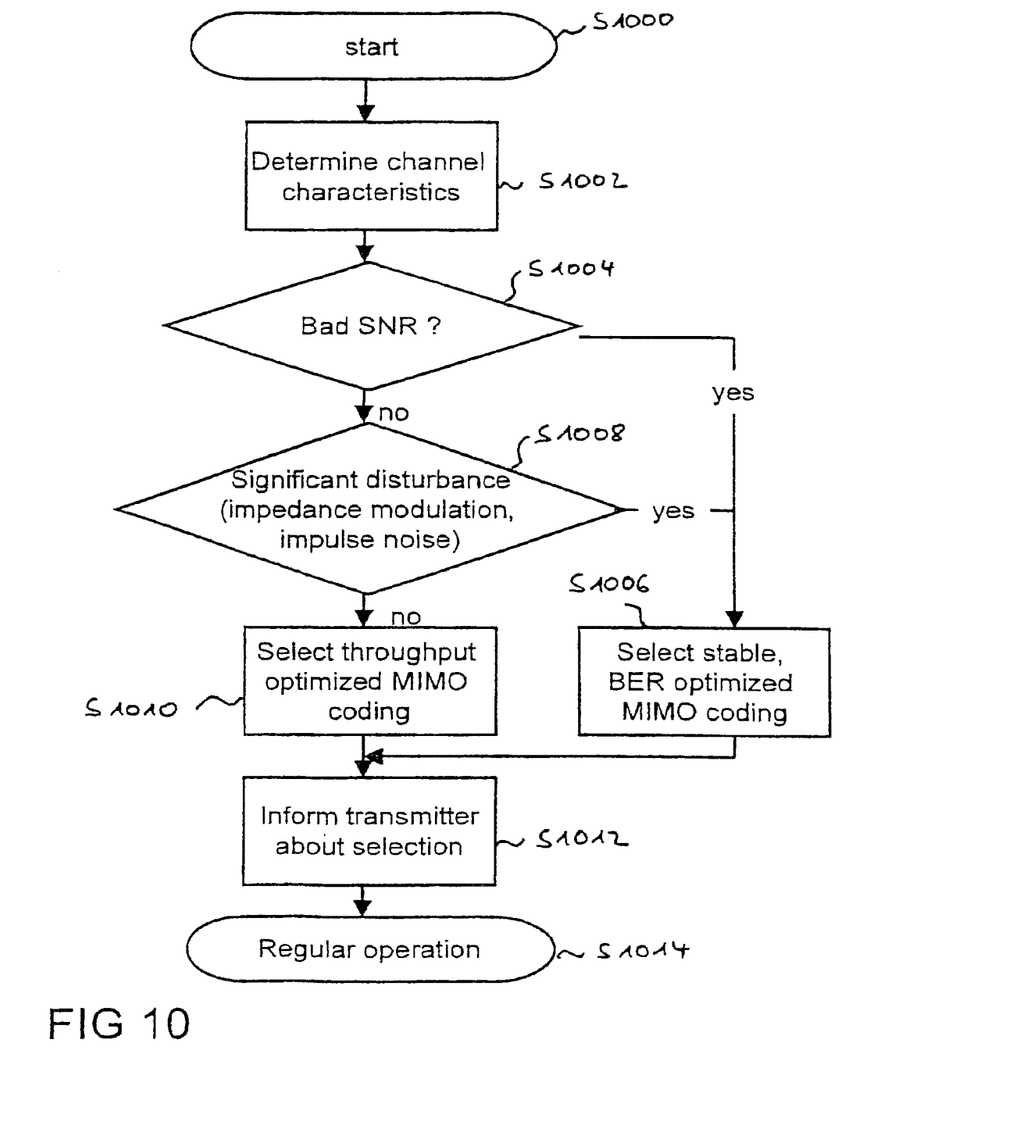
FIG. 10 shows steps of a further embodiment of the invention.

In FIG. 10 steps for determining an appropriate MIMO coding scheme is depicted. After the operation has been started in step 1000, the channel characteristics are determined in a step S1002. Afterwards in a step S1004 it is investigated whether the signal-to-noise-ratio SNR is below a certain threshold. If the answer is yes in a step S1006 a stable, bit error rate (BER)—optimized MIMO coding is selected, for example, an Alamouti MIMO scheme. If the signal-to-noise-ratio is above a certain threshold it is determined whether significant disturbances are present in the power line network in a step S1008. If a significant disturbance is present then in a step S1006 a stable, bit error rate optimized MIMO coding like Alamouti MIMO is used for the transmission as well. If there are no disturbances in the power line network then in a step S1010 a throughput optimized MIMO coding, like HBLAST, VBLAST or Eigenbeamforming-MIMO is selected. Afterwards in a step S1012 the transmitter is informed about the selection which selection should be used afterwards in a regular operation in a step S1014. Thus, depending on the channel characteristics, and/or the bandwidth demand of the application, an appropriate MIMO coding is selected.

In order to determine the quality of the channel, an initial phase before regular operation is proposed. During this initial phase the power line communication channel is examined for disturbances (impedance modulating or impulsive noise). All available MIMO schemes are tested sequentially. The best MIMO mode regarding throughput and/or bit error rate might be chosen.

Figure 11:
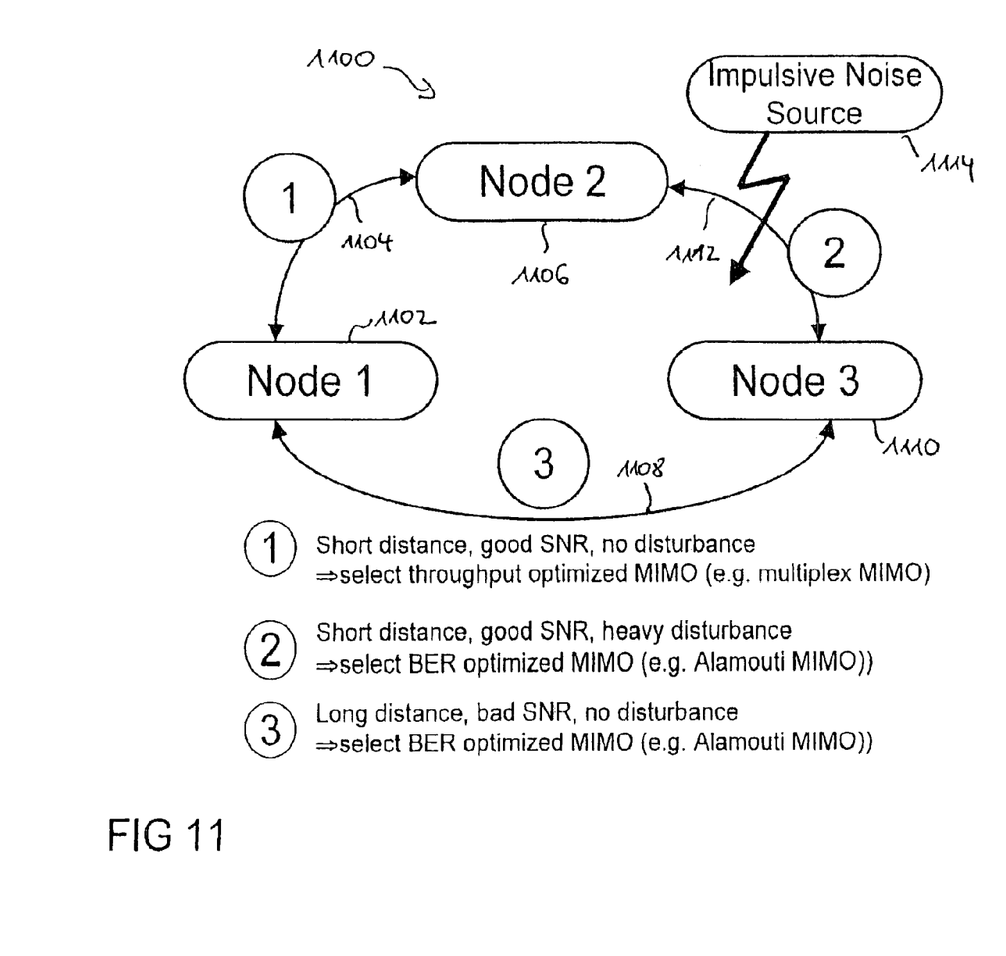
FIG. 11 shows a block diagram of a power line communication system according to a further embodiment of the invention.

In FIG. 11 a further embodiment for a power line communication system 1100 is depicted. In the power line communication system 1100 a first node 1102 is connected via a first channel 1104 with a second node 1106 and via a second channel 1108 with a third node 1110. The second node 1106 and the third node 1110 are connected via a third channel 1112. As an example an impulsive noise source 1114 disturbs the third channel 1112 between the second node 1106 and the third node 1110.

Since the selection of the MIMO mode might be performed for each connection between all nodes, 1102, 1106, 1110 in the network 1100, different connections between different nodes might choose different MIMO modes depending on the connection conditions. In the example depicted in FIG. 11 the communication between the first node 1102 and the second node 1106 on the first channel 1104 with a short distance has a good signal-to-noise-ratio SNR without any disturbance. Thus, a throughput optimized MIMO can be chosen. On the third channel 1112 between the second node 1106 and the third node 1110 there is a disturbance present, resulting from the impulses of the noise source 1114. Thus, even if there is only a short distance between the second node 1106 and the third node 1110 the bit error rate optimized MIMO (e.g. Alamouti) is selected. Between the first node 1102 and the third node 1110 there is a long distance on the second channel 1108 but no disturbance is present. A bit error rate optimized MIMO (e.g. Alamouti) might be selected in order to overcome a bad SNR due to the long distance.

Due to the quasi-static behavior of power line communication channels the process to determine the optimized MIMO mode might be performed when a new node enters the network (and again if the channel conditions change fundamentally). It is proposed how to select the best possible feeding ports for MIMO communication over power line communication channels. The channel characteristics for different feeding ports are measured for all transmission possibilities and the port with the worst channel characteristics is excluded from further communication. In addition it has been prevented how to deal with impedance modulating devices in order to choose the appropriate feeding ports for different parts of an alternating current.

What is claimed is:

1. A method for receiving signals over a power line network, wherein within said power line network at least one transmitter and at least one receiver communicate via at least two channels, each of said channels having a respective feeding port of said at least one transmitter and a respective receiving port of said at least one receiver, and said receiver having at least two receiving ports, the method comprising:

determining a channel characteristic of each of said channels;

applying a receiving port selection criterion based on said channel characteristic; and selecting an excluded receiving port among said at least two receiving ports based on said receiving port selection criterion, wherein said excluded receiving port is not used during further communication.

2. The method according to claim 1, further comprising:

dividing a period of an alternating current of said power line network into at least a first part and a second part;

determining a first channel characteristic for said first part and a second channel characteristic for said second part;

selecting a first excluded receiving port for said first part based on said receiving port selection criteria and a second excluded receiving port for said second part based on said receiving port selection criteria.

3. The method according to claim 1, further comprising:

determining a respective channel capacity based on said channel characteristic for said channels;

determining an excluded channel with a channel capacity below a predetermined threshold; wherein said excluded channel is not used during further communication.

4. The method according to claim 3, further comprising:

transmitting an OFDM test signal via a plurality of channels simultaneously; and determining a respective plurality of channel capacities for said plurality of channels based on a received version of said OFDM test signal.

5. The method according to claim 3, further comprising:

setting a multiple-input multiple output-coding scheme based on said respective channel capacities.

6. The method according to claim 5, wherein in a case of a channel capacity below a predetermined threshold said set multiple-input multiple output coding scheme is a bit error rate optimized multiple-input multiple output coding scheme.

7. The method according to claim 6, wherein said bit error rate optimized multiple-input multiple-output coding scheme is an Alamouti multiple-input-multiple output coding scheme.

8. The method according to claim 5, wherein in a case of a channel capacity above a predetermined threshold said set multiple-input multiple-output coding scheme is a throughput optimized multiple-input multiple-output coding scheme.

9. The method according to claim 8, wherein the throughput optimized multiple-input multiple-output coding scheme is one of the group of HBLAST, VBLAST, or eigenbeamforming MIMO.

10. A receiver for receiving signals from a transmitter via a power line network, comprising:

at least two receiving ports for receiving signals via at least two channels of said power line network;

a channel estimation unit configured to determine channel characteristics of said at least two channels;

a processor configured to determine an excluded receiving port of said at least two receiving ports based on said channel characteristics of said at least two channels wherein the excluded receiving port is not used during further communication.

11. The receiver according to claim 10, wherein said processor is further configured to select a first excluded receiving port for a first part of a period on an alternating current and to select a second excluded receiving port for a second part of said period based on a determination of a first channel characteristic for said first part and of a second channel characteristic for said second part.

12. The receiver according to claim 10, wherein said processor is further configured to exclude a channel with a channel capacity below a predetermined threshold from further communication.

13. The receiver according to claim 10, wherein said processor is further configured to detect a multiple-input multiple-output coding scheme based on said respective channel capacities.

14. A power line communication modem, comprising a receiver according to claim 10.

15. A power line communication system comprising at least two power line communication modems according to claim 14 connected via at least three conductors.

\* \* \* \* \*